July 3, 1934.  M. DE HAAS  1,965,221
BACKLASH ELIMINATOR
Filed April 4, 1932   2 Sheets-Sheet 2
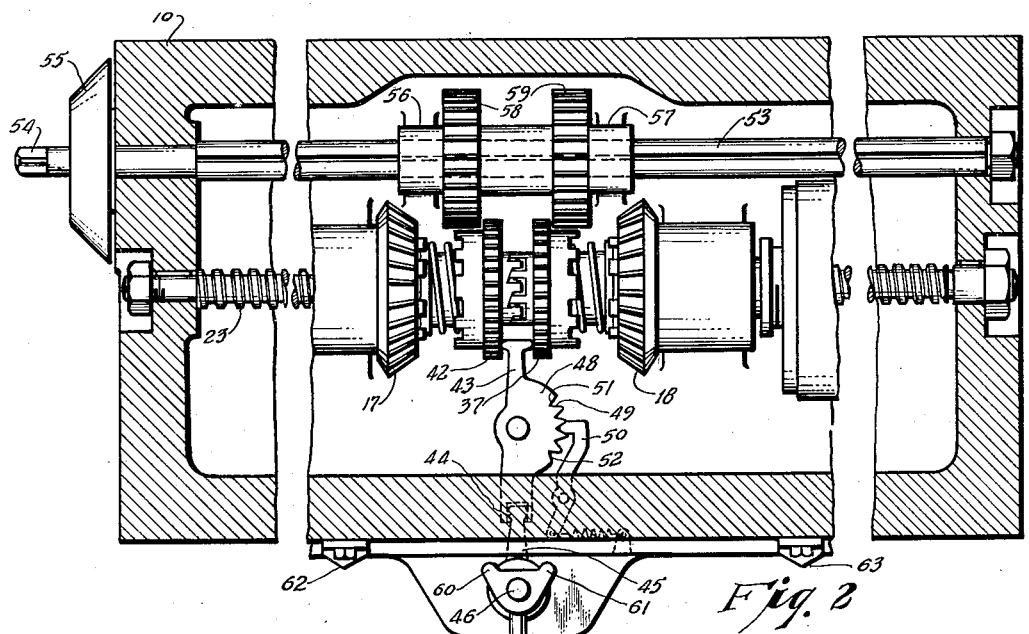
Fig. 2
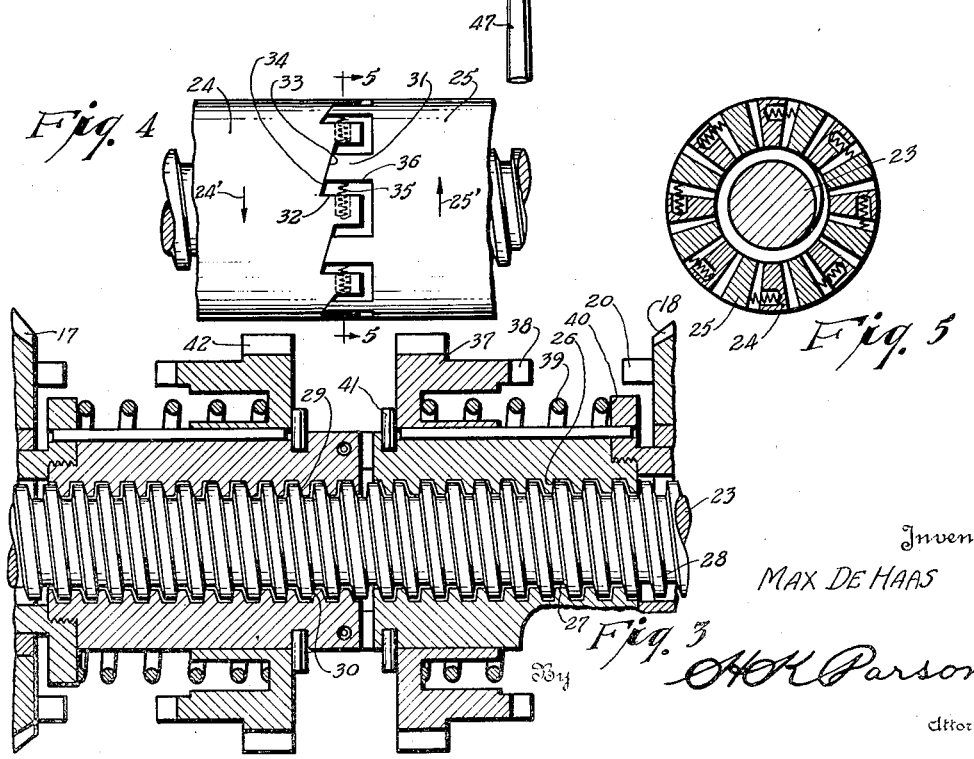
Fig. 4
Fig. 5
Fig. 3
Inventor
MAX DE HAAS
By AHK Parsons
Attorney Patented July 3, 1934

1,965,221

UNITED STATES PATENT OFFICE 1,965,221

BACKLASH ELIMINATOR

Max de Haas, Cincinnati, Ohio, assignor to The Cincinnati Milling Machine Company, Cincinnati, Ohio, a corporation of Ohio Application April 4, 1932, Serial No. 602,917

19 Claims. (Cl. 90—21)

This invention relates to improved drive mechanism for machine tool slides.

One of the principal objects of this invention is to provide an improved drive mechanism for reciprocating a slide which is sufficiently positive in operation to prevent sudden accelerated movements of the slide as by a cutting force acting in the direction of slide movement, and yet sufficiently resilient to absorb the intermittent shock of a toothed cutter and thereby prevent chatter in the machine.

Another object of this invention is to provide an improved back lash eliminator for machine tool mechanisms.

A further object of this invention is to provide improved means for absorbing shock between a movable slide and its drive mechanism thereby preventing the transmission of vibrations from the slide to its actuating mechanism.

Other objects and advantages of the present invention should be readily apparent by reference to the following specification considered in conjunction with the accompanying drawings illustrative of one embodiment thereof, but it will be understood that any modifications may be made in the specific structural details within the scope of the appended claims without departing from or exceeding the spirit of the invention.

Referring to the drawings in which like reference numerals indicate like or similar parts:

Figure 2 is a longitudinal section as viewed on the line 2—2 of Figure 1.

Figure 3 is a detailed view of the sections of the lead screw actuating nut.

Figure 4 is a detailed view showing the connections between the two halves of the operating nut.

Figure 5 is a section on the line 5—5 of Figure 4.

Figure 1:
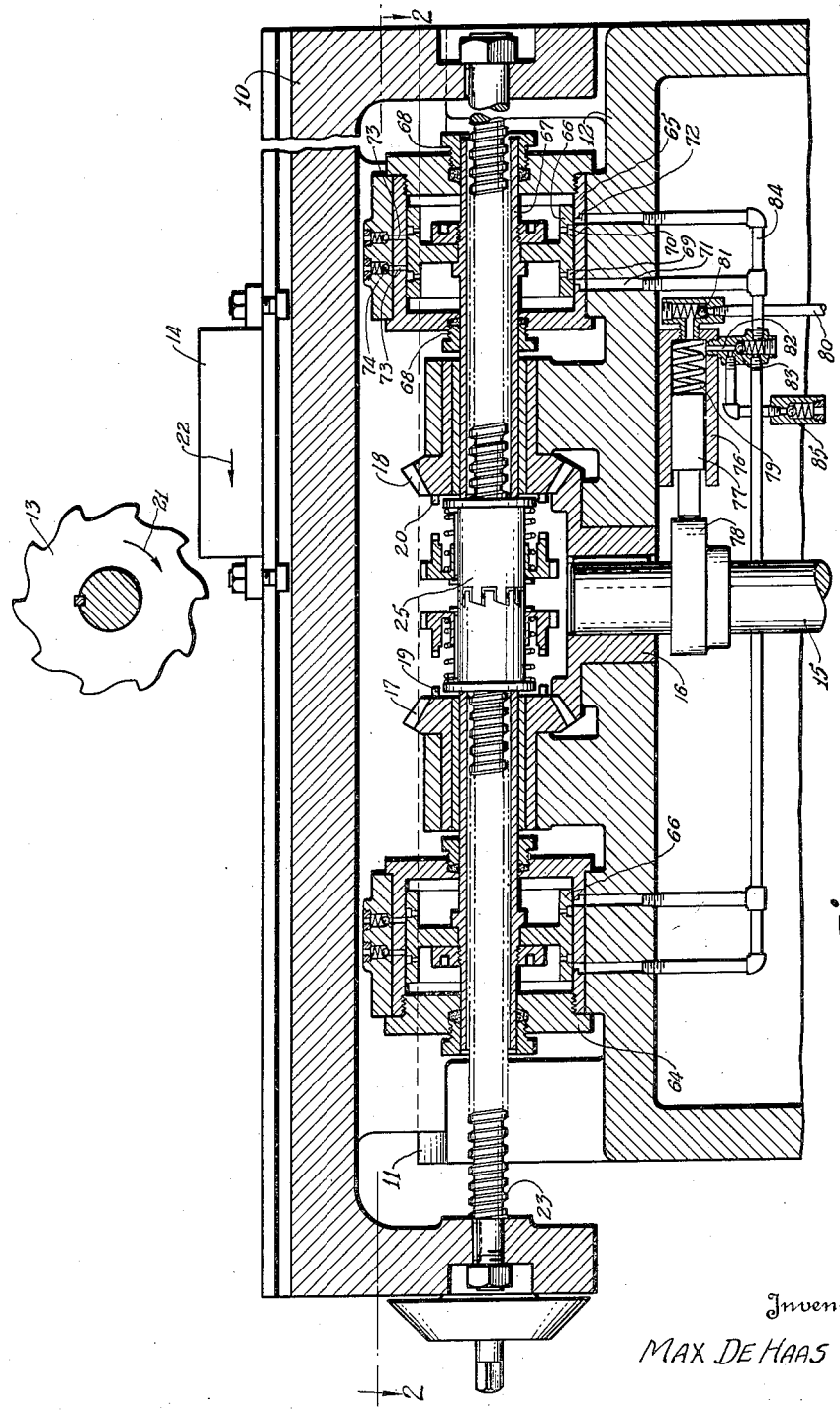
Figure 1 is a vertical section showing the application of the invention to the movable slide of a machine tool.

The reference numeral 10 indicates a conventional machine tool slide which is reciprocably mounted upon guideways 11, the guideways being formed in a support member 12. Since this invention is particularly applicable to milling machines, a rotary toothed cutter 13 is illustrated in connection with the table for operation upon a work piece illustrated generally by the reference numeral 14.

One form of power transmission for such slides comprises a unidirectionally rotated power shaft such as 15 having a bevel gear 16 secured to the end thereof in mesh with a pair of opposed bevel gears 17 and 18. By this arrangement bevel gears 17 and 18 are constantly rotated in opposite directions and thereby constitute a reverser, the opposing faces of the gears being provided with clutch teeth such as 19 and 20 by means of which the gears are selectively connected to the translating member for effecting movement of the slide in either direction.

In taking what is known as a hook-in cut on a milling machine, or in other words, if the cutter 13 is assumed to be rotating in the direction of the arrow 21 and the work feeding in the direction of the arrow 22, it will be seen that the teeth of the cutter would attempt to pull the work piece 14 in the direction of the arrow 22. If lost motion existed in the slide actuating mechanism, this pull by the cutter would take up the lost motion and thereby suddenly accelerate the movement of the slide causing damage either to the cutter or work. It is therefore desirable that means be provided for eliminating lost motion between the slide and its actuating mechanism in order that such a condition may be eliminated thereby permitting the hook-in method of milling to be performed, it being deemed to be more efficient than other methods.

Mechanism is therefore provided for coupling the slide 10 to bevel gears 17 or 18 in such a manner that no lost motion exists. As shown in Figure 1, the table 10 is provided with a lead screw 23 which is fixed in the opposite ends of the table for axial movement therewith but held against relative rotary movement. This lead screw passes through, or has threaded thereon, a rotary internally threaded means composed of two parts or members 24 and 25. If these two members are axially separated, it will be seen from Figure 3 that one side 26 of the internal threads of the nut 25 will engage the left hand side 27 of the lead screw thread 28; and the side 29 of the internal thread of nut 24 will engage the right hand side 30 of the lead screw thread 28. Accordingly, all the internal threads of the member 25 will bear against one side of the lead screw thread, while all the threads of the member 24 will bear against the opposite side of the screw thread. If these two members are now maintained in this axially separated condition it will be seen that no back lash will exist between the lead screw and its operating nut.

This separation is maintained in the present invention by providing the opposed ends of the members 24 and 25 with interengaging tooth and socket connections somewhat in the form of clutch teeth the member 25 being provided with axially projecting teeth 31 which enter sockets 32 formed in the end of member 24. As shown in Figure 4, the end faces 33 of the teeth 31 are beveled or formed at an angle to the direction of rotation of the nut, and the bottom wall 34 of the socket 32 is similarly beveled. A spring 35 is interposed between one side 36 of the tooth 31 and the side wall of the socket 32 to effect a relative rotation of the two members in opposite directions as indicated by arrows 24' and 25', this relative rotation causing the tooth 33 to slide along the inclined surface 34 thereby causing an axial thrust and resultant separation of the two members. By means of this mechanism it will be seen that there is a constantly existing urge to maintain the parts separated and thereby eliminate at all times any back lash between the lead screw and its actuating member.

Attention is also invited to the fact that when the members 24 and 25 are power rotated, they are rotated in these respective directions, because it will be noticed that rotation in the opposite direction of either member would tend to cause the members to approach one another. If it is found that the bevel gears 17 and 18 rotate in opposite directions relative to arrows 24' and 25', the angle of inclination between the faces will be reversed.

The member 25 has splined thereon the sleeve gear 37 which is provided with clutch teeth 38 on one face for engaging the clutch teeth 20 of the gear 18 upon axial movement to the right as viewed in Figure 3. A spring 39 is interposed between the gear 37 and a fixed shoulder 40 for normally maintaining the gear out of mesh with the driving gear 18. Diametrically opposed pins 41 may be inserted in the periphery of the member 25 to limit axial movement of the gear 37 in the opposite direction.

A similar clutch gear 42 is splined on the periphery of the member 24 for effecting rotation thereof by the drive gear 17 and similar mechanism is provided for normally maintaining the clutch disconnected. As previously mentioned, the gears 17 and 18 constitute a reverser and engagement of gear 37 with its driving gear will effect movement of the slide in one direction; and engagement of gear 42 with its driving gear 17 will effect movement of the slide in the opposite direction.

Mechanism has been provided for shifting the sleeve gears 37 and 42 comprising a pivoted shifter member 43 interposed between the two gears as shown in Figure 2, the opposite end of the shifter having a ball and socket connection 44 with a lever arm 45 keyed to the end of rock shaft 46 having integral therewith, the operating handle 47. By means of the intermediate connections between the manual operating lever 47 and the shifter member 43, it will be seen that the handle 47 is a directional control lever; that is, movement to the left effecting movement of the gear 42 into engagement with its driving gear causing the slide to move to the left, and movement to the right effecting engagement of the gear 37 with its driving gear and causing movement of the slide to the right. In order to maintain the control parts in various positions, as against the compression of spring 39 for instance, the member 43 is provided with a semi-circular portion 48, on the periphery of which is formed a plurality of V-shaped notches 49 adapted to be engaged by a pivoted detent 50. As shown in Figure 2 the control mechanism is in neutral position. Upon movement of the shifter 43 to either extreme position, the detent 50 will selectively engage notches 51 or 52 to maintain the parts in power transmitted position.

It will be noted that the member 43 is provided with intermediate notches between the central notch and the two extreme notches and this is for the purpose of coupling the gears 37 and 42 with the manual operating mechanism for the slide. This mechanism comprises a splined shaft 53 which is journaled at opposite ends in the slide 10, the exterior end of the shaft being provided with a squared end 54 for receiving an operating handle, and also with a feed dial 55 for indicating the amount of movement effected. The shaft 53 passes through a pair of bosses 56 and 57 formed integral with the slide support 12. Splined on the shaft between these bosses which prevent longitudinal movement, are a pair of spaced spur gears 58 and 59. These gears are spaced wide enough apart that they will not be engaged by either the gear 37 or 42 when these gears are in a neutral position. Therefore when the machine is stopped and it is desired that the table be manually actuated, it is necessary to move the control lever 47 in the desired direction, to couple the proper gear such as 37 or 42 with its respective actuating gear 59 or 58. A pair of spur gears 58 and 59 are necessary on account of the connecting mechanism between the members 24 and 25, each of which must be rotated in a certain direction in order to constantly eliminate back lash from the transmission. It will be apparent that further movement of the gear 37 or 42 beyond this manual operating position will effect coupling of the gear with its power actuator.

For automatic operation, the lever 47 as shown in Figure 2 is provided with a pair of radially extending lugs 60 and 61 for engagement by the respective trip dogs 62 and 63 carried in the usual T-slots formed in the front of the table whereby engagement of either dog with the respective lug will effect disengagement of the respective driving gear from the lead screw and automatically stop movement of the table.

In a milling machine certain disadvantages are encountered if the slide is coupled mechanically to its driving mechanism due to the fact that a milling cutter is formed with a plurality of teeth which develop an intermitting cutting force thereby causing vibration of the work support. It has been noticed in hydraulic transmissions, however, that the resilience of the hydraulic drive has eliminated a large part of this vibration due to the cushion effect of the hydraulic medium. Provision has been made in the present invention for obtaining this resilient effect while retaining the positive features of the mechanical drive. In other words, a mechanical drive is desirable because during power actuation of the slide 10 for instance, the dial 55 will be rotated and will indicate the exact amount of feed during a given movement which is not possible with hydraulic transmissions. But a mechanical transmission is directly connected to the support so that vibrations thereof are transmitted throughout the machine. Means have been provided therefore for coupling the slide to its transmission in such a manner that these vibrations will be damped out thereby obtaining the cushioning effect of a hydraulic transmission while retaining the advantages of a mechanical transmission.

This is effected by providing a floating connection between the operating members 24, 25 and their support. As shown in Figure 1, a pair of cylinders 64 and 65 are integrally secured to the support 12 and each has reciprocably mounted therein a piston 66. Since the construction of the pistons is the same, only one will be described. The piston 66 has a piston rod 67 secured thereto which is slidably mounted in stuffing boxes 68 mounted in opposite ends of the cylinder, the piston rod 67 being in the form of a sleeve surrounding the lead screw 23 and extending to one of the internally threaded members such as 25, to which it is integrally connected for axial movement therewith.

Each piston has a pair of axially spaced annular grooves 69 and 70 formed in its periphery, the groove 69 communicating with inlet port 71, and groove 70 communicating with inlet port 72. Each of these grooves also communicates with outlet ports 73 controlled by check valves 74. When the piston 66 is in a central position with respect to the pressure ports 71 and 72, the ports will slightly overlap the grooves and fluid will flow through the annular grooves 69 and 70 to the outlet ports 73, the check valves causing sufficient resistance that fluid entering each end of the cylinder will maintain a slight pressure therein sufficient to maintain the piston in a central position. Upon movement of the piston 66 in either direction as for instance to the right, the annular groove 70 will be moved into fuller connection with the port 72 and the groove 69 will be moved out of connection with the pressure port 71 thereby causing pressure to build up in the right hand end of the cylinder and the pressure to drop on the opposite side, thereby setting up an unbalanced condition which will cause the piston to move back to its neutral or central position.

From this it will be seen that if the nut 24 is rotating in the direction of arrow 24', and assuming that the lead screw has a right hand thread cut thereon, the member 24 will attempt to feed the lead screw 23 to the left and the member must therefore be held against movement to the right, such movement causing the piston 66 to move toward the right in the manner just explained. This will cause pressure to build up in the right hand end of the cylinder 65 to counter-balance this reaction and hold the member 24 in its position and thus make it possible for it to feed the lead screw and slide connected therewith toward the left. This movement of the member 24 to the right will also be communicated to the piston in the cylinder 64 tending to cause it to move simultaneously therewith which would build up an opposing pressure in this cylinder also. Conversely, it will be seen that any sudden shock imparted to the table 10 by variations in the cutting force will be transmitted through the lead screw and members 24 and 25 to the pistons 65 and 66 to be absorbed by the hydraulic pressure acting thereon. This reduces the continual pounding between the threads of the nut and the lead screw, reducing the amount of wear and thereby maintaining accuracy in the machine.

Hydraulic pressure is supplied to the cylinders from a suitable pump, such as the plunger pump 76, illustrated in Figure 1, which has a plunger 77 maintained in constant engagement with the periphery of the cam 78 by a spring 79 mounted between the inner end of the plunger and the wall of the pump casing. The cam 78 may be fixed to the continuously driven shaft 15, thereby insuring pressure at all times. An inlet pipe 80 having a check valve 81 therein, serves to supply the pump during outward stroke of the plunger, and upon return stroke, the check valve 81 closes, causing the trapped fluid to be forced through the pressure port 82 and past the check valve 83 into the supply channel 84. The check valve 83 closes during outward movement of the plunger to prevent withdrawal of pressure from channel 84. If so desired, a second check valve 85 may be provided to serve as an over-flow valve in case the pressure rises too high in the system. The over-flow from the check valves 74 in the cylinders may be returned by gravity to a suitable reservoir tank formed in the support 12 from which the supply to the line 80 is drawn. If it is found that a single plunger pump such as 76 produces too great a pulsation in the power supply line 84, a plurality of these pumps may be radially arranged around the cam 78 to provide a more even and continuous flow.

There has thus been provided an improved drive mechanism for a machine tool slide which is especially adaptable for use in milling machines because it makes possible the taking of hook-in cuts without the possibility of damage from lost motion in the transmission; and which is so constructed that it will absorb vibrations resulting from the use of toothed cutters thereby combining the advantages of a mechanical feed with those of a yieldable hydraulic feed.

That which is claimed is:

1. A power drive for a machine tool slide, including a lead screw attached to the slide, a pair of internally threaded members mounted on the screw, a pair of coaxial power driven members constantly rotated in opposite directions disposed at the external ends of said threaded members, means to couple one of the threaded members to the power driven member adjacent thereto for effecting translation of the slide in one direction, means to couple the other threaded member to the remaining power driven member to effect translation of the slide in the opposite direction, and means interposed between the members whereby power actuation of either member will cause axial separation of the other member thereupon and eliminate lost motion between the slide and its drive.

2. A power drive for a machine tool slide including a lead screw attached to the slide, a pair of internally threaded members mounted on the screw, a pair of coaxial power driven members constantly rotated in opposite directions disposed on opposite sides of said threaded members, means to couple one of the threaded members to the power driven member adjacent thereto for effecting translation of the slide in one direction, means to couple the other threaded member to the remaining power driven member to effect translation of the slide in the opposite direction, and means to automatically disconnect one of said threaded members from its driver upon coupling of the other threaded member with its respective driver.

3. A power drive for a machine tool slide including a lead screw attached to the slide, a pair of rotatable nuts mounted on the screw, a source of power, means to couple selectively the power to either nut to effect rotation thereof and movement of the slide in a given direction, means interposed between the nuts to maintain axial separation thereof whereby lost motion between the nuts and the lead screw will be eliminated, said interposed means comprising circumferentially extending wedge surfaces, the angle of inclination of which is such that power rotation of either member in its respective direction will effect axial separation of the member, said last named means also coupling the nuts for joint rotation.

4. A power drive for a machine tool slide including a lead screw attached to the slide, a pair of rotatable nuts mounted on the screw, a source of power, means to couple the power to either nut to effect rotation thereof and thus movement of the slide in a given direction, means interposed between the nuts to maintain axial separation thereof whereby lost motion between the nuts and the lead screw will be eliminated, said interposed means comprising inter-engaging tooth and socket connections, bevel surfaces formed on the end of the teeth carried by one member engaging bevel services formed at the bottom of the interdental space of the other member, whereby power rotation of either nut will effect axial separation of the other nut, and resilient means interposed between the longitudinal faces of the inter-engaging teeth to maintain the nuts normally rotated in opposite directions with respect to one another to eliminate back lash between the rotatable members and the lead screw.

5. A power drive for a machine tool slide including a lead screw fixed to the slide, a pair of internally threaded members mounted on the screw, a power shaft, an axially shiftable clutch member splined on the periphery of each threaded member, a pair of coaxial oppositely driven clutches connected to the power shaft for constant rotation, and means to axially shift either clutch member into engagement with the respective power driven clutch to effect rotation of the threaded members in opposite directions and thereby reciprocation of the slide.

6. A power transmission for a machine tool slide including a lead screw attached to the slide, a pair of internally threaded members mounted on the screw, a coaxial bevel gear journaled at each end of the threaded members, a power shaft, means to couple the bevel gears to the power shaft for constant rotation thereby, axially shifted clutch sleeves splined on the periphery of the internally threaded members, clutch teeth formed on the opposed faces of the bevel gears, means to shift either clutch sleeve into engagement with the clutch teeth of the adjacent bevel gear for effecting joint rotation of the threaded members, and means to neutralize the clutches including springs interposed between the clutch sleeves and the ends of their respective supporting members adjacent the bevel gears.

7. A power transmission for a machine tool slide including a lead screw integrally attached to the slide, separate internally threaded members mounted on the screw, means interposed between the ends of said members to maintain the parts axially separated whereby lost motion between the threaded members and the lead screw will be eliminated, a power shaft, coaxial oppositely rotated members constantly driven by the shaft, individual clutches for coupling the threaded members with respective power driven members, a shifter interposed between the clutches to effect selective engagement of either, detent mechanism for maintaining the shifter in either position and a directional control lever coupled to the shifter whereby rotation of the lever in a given direction to effect selective engagement of the clutches will effect movement of the slide in said given direction.

8. A transmission for a machine tool slide having a lead screw integrally attached thereto, individual threaded members mounted on the screw, means to effect axial separation of said members to thereby eliminate back lash between the members and the lead screw, means coupling the members together for joint rotation, an individual gear slidably splined on each member, means to maintain the members against axial movement relative to the screw whereby rotation of either member will effect movement of the slide, means to effect manual rotation of the members including a splined shaft rotatably journaled in the slide, a pair of spaced gears mounted on the splined shaft but held against axial movement, means to selectively engage either of said individual gears with a respective gear on the splined shaft to determine the direction of movement of the slide and means to rotate manually the splined shaft to effect said movement.

9. A transmission for a machine tool slide comprising a support, a slide mounted on the support, a lead screw attached to the slide, a pair of internally threaded members mounted on the screw, means to prevent axial movement of the threaded member relative to the screw whereby rotation of said members will effect translation of the slide, a pair of coaxial power driven bevel gears journaled at each end of the threaded members, a pair of spaced spur gears journaled in the slide support parallel to the lead screw, individual sleeves splined on the threaded members, said sleeves carrying clutch teeth on their remotely disposed ends, a gear fixed to the periphery of each sleeve, said gears being normally positioned intermediate the spur gears, and means to shift either sleeve to effect engagement of its gear with a spur gear for manual rotation of the threaded member, said sleeve adapted to be given a further movement in the same direction to effect engagement of the clutch teeth thereof with the clutch teeth of the bevel gear for power rotation of the threaded member.

10. In a machine tool having a translatable slide, a support therefor, a transmission for effecting translation of said slide including a lead screw integrally attached to the slide, internally threaded means engaging said screw, said means being held against axial movement, axially shiftable means operatively connected to the threaded means, a pair of manually rotatable members journaled in the slide support adjacent said shiftable means, power driven members oppositely disposed axially of said shiftable means, a control lever, means coupling the control lever to said shiftable means, said control lever having a neutral position and two operative positions on either side thereof, detent mechanism for holding the lever in any one of five different positions whereby movement to the first position on either side of the neutral position will effect coupling of the shiftable means with the manually actuated means for effecting manual translation of the table in either direction and upon movement to the second position on either side of the neutral position will effect coupling of the shiftable means with the power driven members for effecting power operation of the slide in either one of two directions.

11. In a machine tool having a translatable slide, a support therefor, a transmission for effecting translation of said slide including a lead screw integrally attached to the slide, internally threaded means engaging said screw, axially shiftable means operatively connected to the threaded means, a pair of manually rotatable members journaled in the slide support adjacent said shiftable means, power driven members oppositely disposed axially of said shiftable means, a control lever, means coupling the control lever to said shiftable means, said control lever having a neutral position and two operative positions on either side thereof, detent mechanism for holding the lever in any one of five different positions whereby movement to the first position on either side of the neutral position will effect coupling of the shiftable means with the manually actuated means for effecting manual translation of the table in either direction and upon movement to the second position on either side of the neutral position will effect coupling of the shiftable means with the power driven members for effecting power operation of the slide in either one of two directions, and trip dogs carried by the slide for moving the control lever from either second position to either first position to disconnect power operation of the slide.

12. A machine tool having a support, a translatable slide mounted in the support, a driving member journaled in the support, a lead screw attached to the slide, internally threaded means mounted on the lead screw, a clutch slidably splined on the threaded means for operatively connecting said means to the driving member, means to lock said sliding clutch into engagement with the driving member and resilient means for restraining the threaded means against axial movement, said splined connection permitting relative movement between the threaded means and clutch carried thereby whereby longitudinal vibration of the table will be absorbed by said resilient means.

13. A machine tool having a support, a translatable slide mounted on the support, a driving member journaled in the support, a lead screw attached to the slide, internally threaded means mounted on the lead screw, a clutch slidably splined on the threaded means for operatively connecting said means to the driving member, means to lock said sliding clutch into engagement with the driving member, resilient means for restraining the threaded means against axial movement, said splined connection permitting relative movement between the threaded means and clutch carried thereby whereby longitudinal vibration of the table will be absorbed by said resilient means, said resilient means including a piston and cylinder, means to couple one of said members to the threaded means, and means to build up an hydraulic cushioning pressure between the parts upon relative movement between the threaded means and its clutch member.

14. A machine tool slide having a lead screw fixed therewith, a pair of internally threaded members mounted on the screw, a piston and cylinder for each member, a piston rod connecting each member with its respective piston, power means for effecting rotation of the members to cause translation of the slide, means to maintain a normal pressure in opposite ends of each cylinder to prevent axial displacement of the threaded members during power rotation thereof, pressure ports formed in each cylinder to normally maintain the piston therein in a central position, exhaust ports in each cylinder positioned adjacent the opposite ends of the respective pistons when said pistons are in the central position whereby axial displacement of the threaded members in either direction will effect opening of a pressure port on one side of the piston and closing of the pressure port on the other side to build up sufficient pressure to cause the parts to return to a central position.

15. A machine tool slide having a lead screw fixed therewith, a pair of internally threaded members mounted on the screw, a piston and cylinder for each member, a piston rod connecting each member with its respective piston, power means for effecting rotation of the members to cause translation of the slide, means to maintain a normal pressure in opposite ends of each cylinder to prevent axial displacement of the threaded members during power rotation thereof, pressure ports formed in each cylinder to normally maintain the piston therein in a central position, exhaust ports in each cylinder positioned adjacent the opposite ends of the respective pistons when said pistons are in the central position whereby axial displacement of the threaded members in either direction will effect opening of a pressure port on one side of the piston and closing of the pressure port on the other side to build up sufficient pressure to cause the parts to return to a central position, a drive shaft for effecting rotation of the threaded members and a pump coupled to the drive shaft to supply pressure to said cylinders.

16. In a machine tool having a support, a slide reciprocably mounted on the support, the combination of mechanically actuated means for effecting movement of the slide including relatively movable members, one of which is attached to the slide, a piston and cylinder, one of which is fixed to the support and the other operatively connected to the remaining relatively movable members, and means to maintain pressure in the cylinder on opposite sides of the piston to absorb the reaction of the movable slide on said relatively movable members.

17. In a machine tool having a support and a slide reciprocably mounted on the support, the combination of mechanically actuated means for effecting translation of the slide including relatively movable members, one of which is connected to the slide, a piston and cylinder, said cylinder being fixed to the support, means operatively connecting the piston to the remaining relatively movable members, means including a pump to maintain pressure in the cylinder on opposite sides of the piston to form a resilient abutment to prevent bodily movement of said members, and a single power driven actuator for the pump and said mechanically actuated means.

18. In a milling machine having a support, a cutter spindle journaled in the support and a table mounted on the support for movement transversely of the spindle, the combination of manually operable means for effecting said movement, oppositely power driven members, clutch mechanism for operatively connecting the table for manual or power movement, a shifter for said mechanism having a first position for disconnecting the table from all motion transmitting means, said shifter being selectively movable to either side of its first position to connect said manually operable means to the table and to additional positions to selectively connect said power driven means with the table, and simultaneously determine its direction of movement.

19. In a milling machine having a support, a cutter spindle journaled in the support and a table mounted on the support for movement transversely of the spindle, the combination of a lead screw fixed with the table, a pair of nuts mounted on the lead screw, lost motion means coupling the nuts for simultaneous rotation, means constantly acting to axially separate said nuts whereby one will bear on one side of the threads of the lead screw and the other will bear on the opposite side of the threads of the lead screw, individual power driven members for each nut, said members being constantly rotated in opposite directions, means to selectively connect either nut with its driver whereby the other nut will be driven through said lost motion connection whereby the one that is connected to its power actuator will act as a driver for the lead screw, and the other will act as a hold back therefor.

MAX DE HAAS.